June 13, 1944.  W. H. ATKINSON ET AL  2,350,996
METHOD OF FORMING PIPE COVERING
Filed Jan. 6, 1940   2 Sheets-Sheet 1
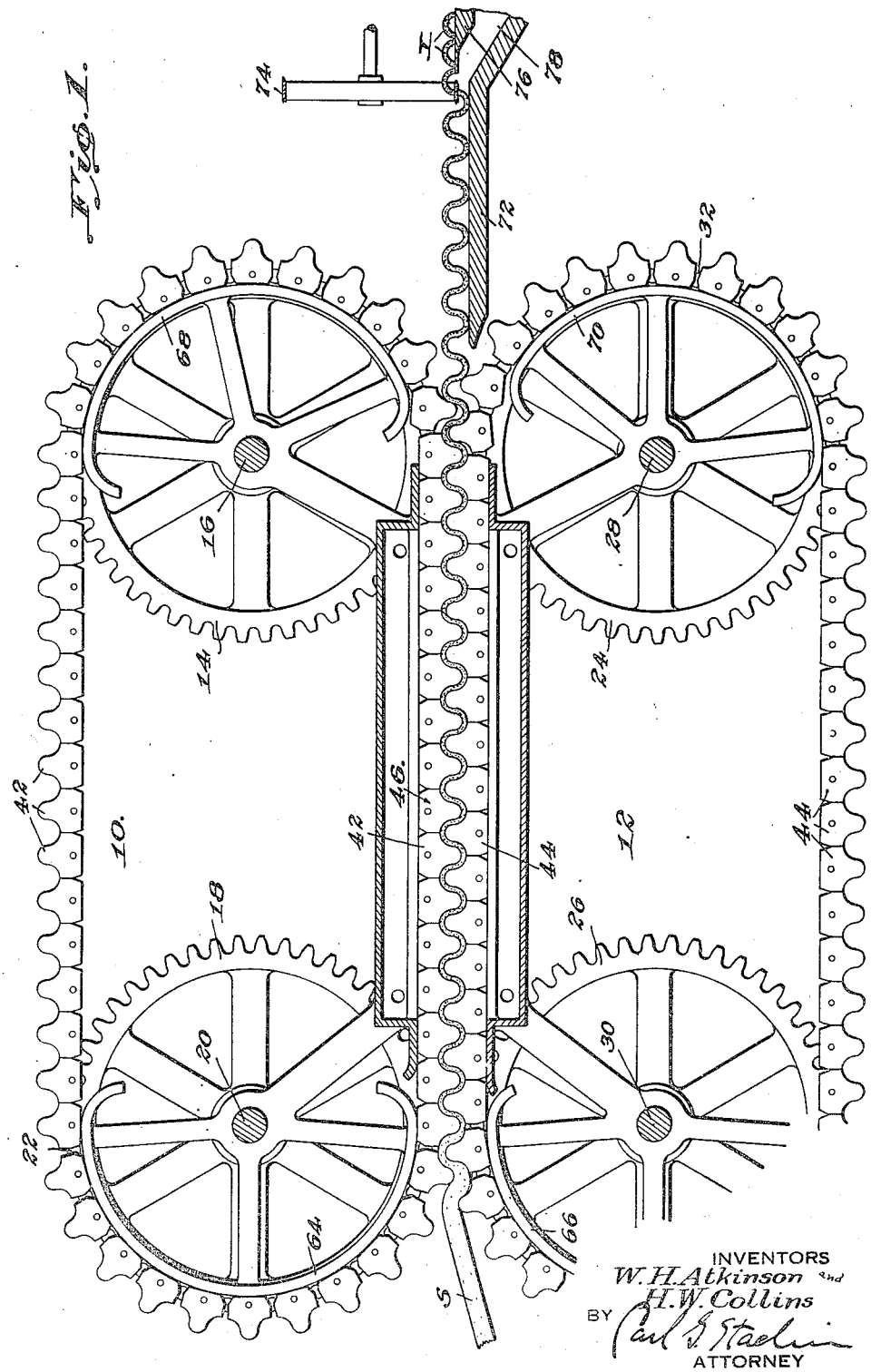
INVENTORS
W. H. Atkinson and
H. W. Collins
BY
ATTORNEY June 13, 1944.  W. H. ATKINSON ET AL  2,350,996
METHOD OF FORMING PIPE COVERING
Filed Jan. 6, 1940  2 Sheets-Sheet 2
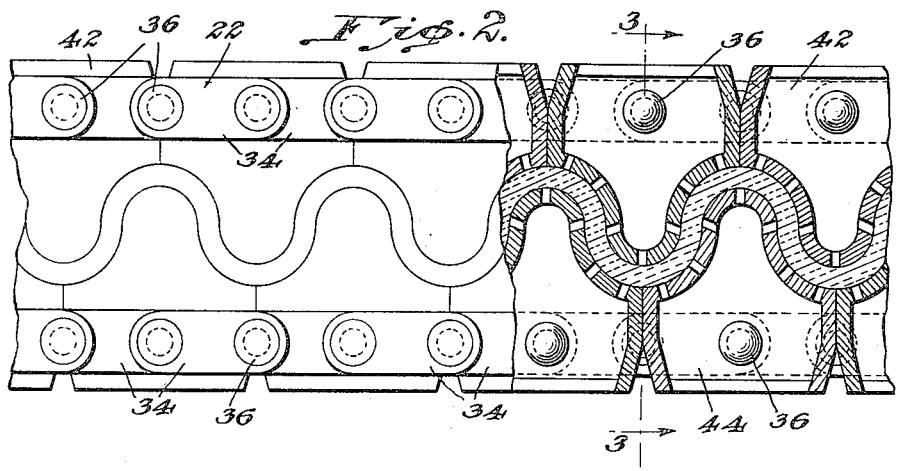
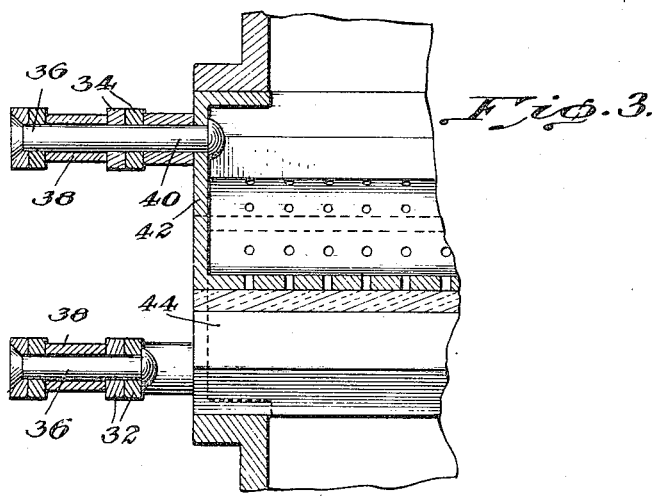
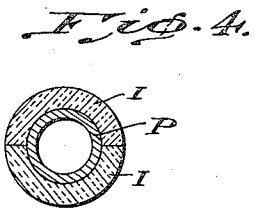
INVENTORS
W. H. Atkinson and
H. W. Collins
BY
ATTORNEY Patented June 13, 1944

2,350,996

UNITED STATES PATENT OFFICE 2,350,996

METHOD OF FORMING PIPE COVERINGS

Warren H. Atkinson, Mount Lebanon, Pa., and Howard W. Collins, Newark, Ohio, assignors to Owens-Corning Fiberglas Corporation, a corporation of Delaware Application January 6, 1940, Serial No. 312,718

4 Claims. (Cl. 18—56)

The present invention relates to a method of forming cylindrical pipe insulating covering of matted and bonded fibrous material such as glass wool or the like. More specifically, the invention relates to a process whereby semi-cylindrical half-sections of a cylindrical pipe covering unit may be formed continuously, the sections being designed for subsequent assembly upon a steam pipe, water pipe, or other pipe to be insulated, in pairs to produce a completed cylindrical covering therefor.

Heretofore in the manufacture of such pipe covering, single units have been constructed either by winding a web of the fibrous material upon a mandrel and heat treating the same after the application of a suitable binder to the web, or by molding separate half-sections of the unit in individual molds by the application of heat and pressure to the impregnated fibrous material undergoing molding. Both of these methods involve considerable manual manipulation of the material before the completed product results and in addition involve many time-consuming operations, particularly the latter method wherein the fitting of the material to the molds, the removal of the material therefrom and the trimming of the material to finished form, are operations that must be resorted to. Furthermore, where individual molds are employed for each half-section of the pipe covering, considerable waste material or trim results from the trimming operation that is necessary to form the sections accurately so that they will fit together in complementary fashion and enclose the pipe to be insulated therebetween.

The present invention is designed to materially increase the rate of production of pipe covering of this character by eliminating the various manual time-consuming operations that have heretofore been employed in its manufacture.

This being the principal object of the invention, it is another object thereof to provide a method for producing such half-sections of pipe covering with little or no waste material or trim occurring on the sections during the formation thereof, thus eliminating any subsequent trimming operations and producing finished sections which are ready for immediate assembly with other identical sections formed in the same process to produce a complete pipe covering.

Other objects and advantages of the invention, not at this time enumerated, will become apparent hereinafter.

In the accompanying two sheets of drawings:

Fig. 1 is a side elevational view, partly in section and somewhat diagrammatic in its representation, of an apparatus suitable for carrying out the process of the present invention for producing sectional pipe covering continuously;

Fig. 2 is a fragmentary enlarged detail side elevational view of a fragment of a die-carrying conveyor employed in connection with the present invention;

Fig. 3 is a sectional view taken substantially along the line 3—3 of Fig. 2;

Fig. 4 is a transverse sectional view taken through a pipe to which the pipe covering has been applied.

Referring now to Figs. 1 to 3 inclusive, a pair of endless mold or die carriers including an upper carrier 10 and a lower cooperating carrier 12 are arranged in contiguous relationship, one above the other. The upper carrier 10 includes a pair of driving sprocket wheels, one of which is shown at 14, mounted on a common shaft 16, and a pair of idler sprocket wheels, one of which is shown at 18, mounted on a common shaft 20. A pair of endless die-supporting chains 22 extend over the respective driving and idler sprocket wheels 14 and 18.

The lower carrier 12 is similar in its construction to the carrier 10 and includes driving and idler sprocket wheels 24 and 26 mounted on carrier shafts 28 and 30 respectively, together with a pair of die-carrying chains 32.

The pairs of die-carrying chains 22 and 32 are substantially identical in their construction and a description of one pair thereof will suffice for the other. Each chain 22 or 32 as the case may be comprises a plurality of individual links 34 (Figs. 2 and 3) arranged in pairs, adjacent links being connected together by means of pivot pins 36 and the links of each pair being separated by spacer sleeves 38. Alternate pins 36 of each chain are elongated as at 40 (Fig. 3) and the corresponding elongated pins of each pair of chains serve to pivotally support therebetween a series of elongated hollow die elements 42 in the case of the upper conveyor 10 and die elements 44 in the case of the lower conveyor 12. The die elements 42 and 44 are thus suspended between corresponding pins 36 at the opposite sides of the apparatus.

The carriers 10 and 12 are positioned one over the other in such a manner that the two carriers have a common straightaway portion or region 46 (Fig. 1) through which the die elements 42 and 44 move in cooperative relationship. The die elements 42 are of hollow open-ended construction and each is formed with die surface that provides a central crest portion (Fig. 2) which merges into trough portions on opposite sides thereof. As the die elements of either carrier move into the straightaway portion 46 their outer rounded ends or projections approach each other due to being pivoted near their bases, and they assume contiguous positions in alignment to provide a more or less continuous die surface which in cross section simulates a sinuous curve. The die elements 44 are similarly shaped and when these latter elements are in the straightaway portion of the conveyor they too present a continuous sinuous die surface the trough portions of which register with the crest portions presented by the die elements 42 and vice versa.

Fibrous sheet material S in the form of a continuous blanket or bat is fed to the conveyors 10 and 12 at one end of the straightaway portion 46 and passes between the upper die elements 42 and the lower die elements 44 and is compressed and heated between the two series of dies and emerges from the apparatus at the other end of the straightaway portion. The sheet material S is preferably formed of glass wool that previously has been impregnated with a bonding material which, upon the application of heat and pressure, becomes set in order to render the sheet material rigid.

Various types of bonding materials may be employed for impregnating the sheet material S but preferably these consist of one or the other of two main types, one type consisting of a synthetic resin (as for example, Bakelite) in solution which upon the application of heat and pressure becomes polymerized to produce a self-supporting fabricated sheet structure and the other type consisting of a material (as for example, an asphaltic compound) having volatile constituents capable of being driven off by the application of heat and pressure to similarly produce a self-supporting fabricated sheet structure.

Referring now to Fig. 1, the inner ends of the die elements 42 and 44 bear against curved guide rails 64 and 66 associated with the conveyors 10 and 12 respectively as these die elements round the receiving end of the apparatus. The rails 64 and 66 serve to maintain the die elements in a substantially radial position in order that proper register of the die surfaces will be attained as the dies move into the straightaway portion 46. Similarly, at the discharge end of the apparatus guide rails 68 and 70 are provided. These latter rails 68 and 70 have their adjacent ends spaced from the straightaway portion 46 a slight distance as shown at the right hand side of Fig. 1 in order that the dies 42 and 44 may swing about their pivotal axes to clear the material which has been hardened in the pressure applying and heating operation thus preventing damage to the same.

Still referring to Fig. 1, the sheet material S which emerges from the straightaway portion 46 and which has been compressed and hardened due either to the curing operation in the case of an asphaltic bonding material having volatile constituents, or to polymerization in the case of a thermosetting material, is of uniform corrugated sheet form. The corrugated sinuous sheet is fed onto a table 72 by means of which it is aligned with a band saw 74 and fed to the saw in such a manner that the sheet is severed along a horizontal plane to produce half-sections I of pipe insulation which are U-shape in cross section.

The sections I which are severed from the crest portions of the corrugated sheet are collected on a platform 76 as shown at the extreme right hand end of Fig. 1 while the sections which are severed from the trough portions of the sheet are passed down a chute 78 and may be collected therefrom in any suitable manner.

It is to be noted that all of the sections I are substantially identical in shape and any two of these sections may be assembled in the manner shown in Fig. 4 upon a pipe P to completely insulate the same. The saw 74 makes a clean severance of the sheet S along a horizontal plane severing the troughs from the crests, and thus the sections I are complete in themselves and ready to apply to a pipe section as insulation without the necessity of subjecting them to a trimming operation.

In the above described form of the invention any suitable means may be employed for preliminarily impregnating the sheet material S prior to the application of heat and pressure thereto. One example of an impregnating means consists of a pair of spray nozzles above and below the sheet S and arranged to direct the impregnant onto both sides of the latter as it feeds into the space between the conveyors 10 and 11. A bentonite, clay, asphalt, pitch, resin, magnesium oxysulphate, agar agar binder or the like may be used. After shaping, air may be drawn through the sheet for drying the solvent or vehicle, and/or may be used for curing the binder. If desired, the sheet may be impregnated with binder material in a manner disclosed in the Collins Patent 2,288,072 of June 30, 1942, or the Simison and Collins Patent 2,189,840 of February 13, 1940. In this latter case a small amount of binder such as a thermosetting binder, e. g. phenol formaldehyde, urea formaldehyde, (1 to 5%) may be added to the tempering oil which is sprayed on the fibers.

Modifications may be resorted to within the spirit and scope of the appended claims.

We claim:

1. The method of producing semi-cylindrical half-sections of pipe covering from a mat of glass wool, which comprises applying bonding material to said mat, feeding said mat forward continuously and progressively compressing the mat in a transverse direction by engaging the mat successively at opposite sides with mating dies and moving said dies toward each other to compact the mat and simultaneously shape the mat into corrugated form, maintaining said dies in compacting relation while moving them in the direction of feeding movement of the mat to hold the mat in compressed and shaped relation as it advances, hardening said bonding material while the mat is held compressed by said dies to produce a rigid form-retaining body, and severing the rigid corrugated mat at the juncture of each adjacent inverse and reverse bend.

2. The method of producing semi-cylindrical half-sections of pipe covering from a mat of glass wool, which comprises applying bonding material adapted to harden upon being heated to said mat, feeding said mat forward continuously and progressively compressing the mat in a transverse direction by engaging the mat successively at opposite sides with mating dies and moving said dies toward each other to compact the mat and simultaneously shape the mat into corrugated form, maintaining said dies in compressing relation while moving them in the direction of feeding movement of the mat to hold the mat in compressed and shaped relation as it advances, heating said mat to a temperature sufficient to harden said bonding material while the mat is held compressed by said dies to bond the fibrous material in a rigid form-retaining body, and cutting the rigid corrugated mat at the juncture of each adjacent inverse and reverse bend.

3. The method of producing semi-cylindrical half-sections of pipe covering from a mat of loose mineral fibers, which comprises continuously feeding the mat forward and passing the mat progressively between coacting dies traveling in the general direction of feeding movement of the mat and adapted to enclose and compress the mat and simultaneously shape the mat into corrugated form, bonding the fibers in the mat together while the mat is held compressed by said dies to produce a rigid form-retaining body, feeding said mat progressively from said dies, and cutting the rigid corrugated mat into semi-cylindrical sections by severing the mat at the juncture of each adjacent inverse and reverse bend.

4. The method of producing semi-cylindrical half-sections of pipe covering from a mat of loose glass fibers impregnated with a heat-hardenable bonding material, which comprises continuously feeding the mat forward and progressively compressing the mat as it advances by exerting pressure on opposite major faces of the mat while simultaneously shaping the mat into corrugated form, maintaining constant pressure on opposite faces of the corrugated mat as the mat advances in feeding direction, heating the mat to harden the bonding material while the mat advances in compressed relation to produce a compact and rigid corrugated mat of glass wool, then releasing the pressure and severing the rigid corrugated mat at the juncture of each adjacent inverse and reverse bend.

WARREN H. ATKINSON.
HOWARD W. COLLINS.